(12) United States Patent
Kim et al.

(10) Patent No.: US 11,248,696 B2
(45) Date of Patent: Feb. 15, 2022

(54) PLANETARY GEAR DEVICE

(71) Applicant: Hyundai Transys Inc., Hwaseong-si (KR)

(72) Inventors: Tae Hoon Kim, Hwaseong-si (KR); Min Sik Kang, Suwon-si (KR); Sang Jin Park, Hwaseong-si (KR)

(73) Assignee: Hyundai Transys Inc., Hwaseong-si (KR)

( * ) Notice: Subject to any disclaimer, the term of this patent is extended or adjusted under 35 U.S.C. 154(b) by 0 days.

(21) Appl. No.: 17/115,336

(22) Filed: Dec. 8, 2020

(65) Prior Publication Data
US 2021/0190178 A1    Jun. 24, 2021

(30) Foreign Application Priority Data

Dec. 20, 2019 (KR) .......................... 10-2019-0171348

(51) Int. Cl.
*F16H 57/04* (2010.01)
*F16H 57/08* (2006.01)

(52) U.S. Cl.
CPC ....... *F16H 57/0479* (2013.01); *F16H 57/043* (2013.01); *F16H 57/0486* (2013.01); *F16H 57/082* (2013.01)

(58) Field of Classification Search
CPC ............ F16H 57/0479; F16H 57/0471; F16H 57/043; F16H 57/0482–0486; F16H 57/082
See application file for complete search history.

(56) References Cited

U.S. PATENT DOCUMENTS 6,817,962 B2 * 11/2004 Tanikawa .............. F16H 57/043
475/159

FOREIGN PATENT DOCUMENTS

| JP | H02-076252 U | 6/1990 |
|---|---|---|
| KR | 10-2002-0080209 A | 10/2002 |
| KR | 10-1896371 B1 | 9/2018 |

* cited by examiner

*Primary Examiner* — Erin D Bishop
(74) *Attorney, Agent, or Firm* — Saliwanchik, Lloyd & Eisenschenk

(57) ABSTRACT

A planetary gear device may include: a carrier plate having a perforated central portion, a plurality of pinion gears rotatably mounted on the carrier plate, a sun gear inserted into the carrier plate and engaged with the pinion gears, a support ring mounted around an outer surface of the sun gear, and a rotation support mounted on the carrier plate and supporting the support ring such that the support ring is rotatable.

18 Claims, 5 Drawing Sheets

PLANETARY GEAR DEVICE

CROSS-REFERENCE TO RELATED APPLICATION

This application claims priority from and the benefit of Korean Patent Application No. 10-2019-0171348, filed on Dec. 20, 2019, which is hereby incorporated by reference for all purposes as if set forth herein.

BACKGROUND

Field

Exemplary embodiments of the present disclosure relate to a planetary gear device, and more particularly, to a planetary gear device able to support a carrier plate.

Discussion of the Background

In a planetary gear device of the related art, a radial support structure of a carrier supports the carrier only on one side using a bearing. Since the carrier is supported only on one side, gear alignment may be unstable during the rotation of the carrier, thereby producing noise, which is problematic.

In addition, a sun gear is located on the other side of the carrier in the radial direction, thereby making it difficult to assemble the sun gear and to obtain a seating surface of the bearing. Thus, it is difficult to support the carrier using the bearing or a bush. Therefore, an improvement is required to solve this problem.

A background technology of the present disclosure is disclosed in Korean Patent No. 10-1896371 (entitled "PLANETARY GEAR DEVICE" and registered on Sep. 3, 2018).

SUMMARY

Various embodiments are directed to a planetary gear device supporting a carrier plate and including a support ring inserted onto the outer surface of the sun gear, thereby facilitating the operation and assembly of a sun gear.

In an embodiment, a planetary gear device may include: a carrier plate having a perforated central portion; a plurality of pinion gears rotatably mounted on the carrier plate; a sun gear inserted into the carrier plate and engaged with the pinion gears; a support ring mounted around an outer surface of the sun gear; and a rotation support mounted on the carrier plate and supporting the support ring such that the support ring is rotatable.

The sun gear may include: a sun gear body inserted into the carrier plate; and a sun gear engagement portion provided on one end portion of the sun gear body and engaged with the pinion gears. The support ring may be mounted on an outer surface of the sun gear body.

The support ring may include: a support ring body mounted on the sun gear body; an oil collector provided inside the support ring body and configured to collect oil discharged from the sun gear body; and an oil outlet communicating with the oil collector and configured to discharge oil to an outer surface of the support ring body and guide the oil to the rotation support.

Each of the oil collectors may be configured such that the width thereof decreases toward a corresponding oil outlet inside the support ring body.

The oil outlet may include a plurality of oil outlets disposed in a circumferential direction of the support ring body.

The plurality of oil outlets may be disposed at equal distances in the circumferential direction of the support ring body.

The carrier plate may have a protruding hub having a receiving recess accommodating the rotation support.

The rotation support may be a bearing.

The rotation support may be a hollow bush.

The planetary gear device according to the present disclosure may support the carrier plate and include the support ring mounted on the outer surface of the sun gear, thereby reducing noise and improving durability.

In addition, according to the present disclosure, the support ring guides the supply of oil from the sun gear toward the rotation support, so that the operation may be smoothly performed.

DETAILED DESCRIPTION OF THE ILLUSTRATED EMBODIMENTS

Figure 1:
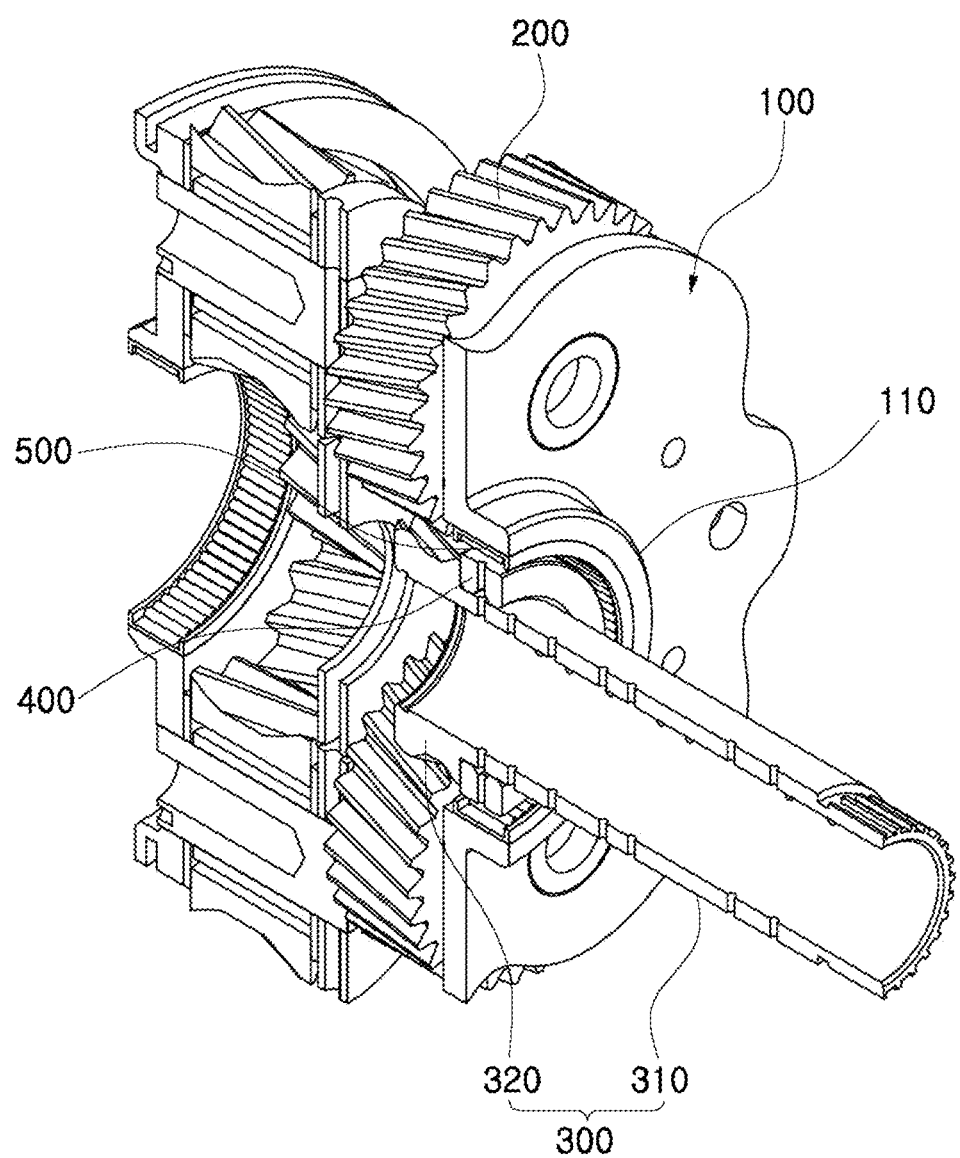
FIG. 1 is a perspective view schematically illustrating a planetary gear device according to an embodiment of the present disclosure.

Hereinafter, embodiments of a planetary gear device according to the present disclosure will be described with reference to the accompanying drawings. In the following description, the thicknesses of lines or the sizes of components illustrated in the drawings may be exaggerated for clarity and convenience of explanation.

In addition, terms used herein are defined in consideration of functions thereof in the present disclosure, but may vary depending on the intentions of users or operators, or practices. Therefore, the terms shall be defined on the basis of the description throughout the specification.

Figure 2:
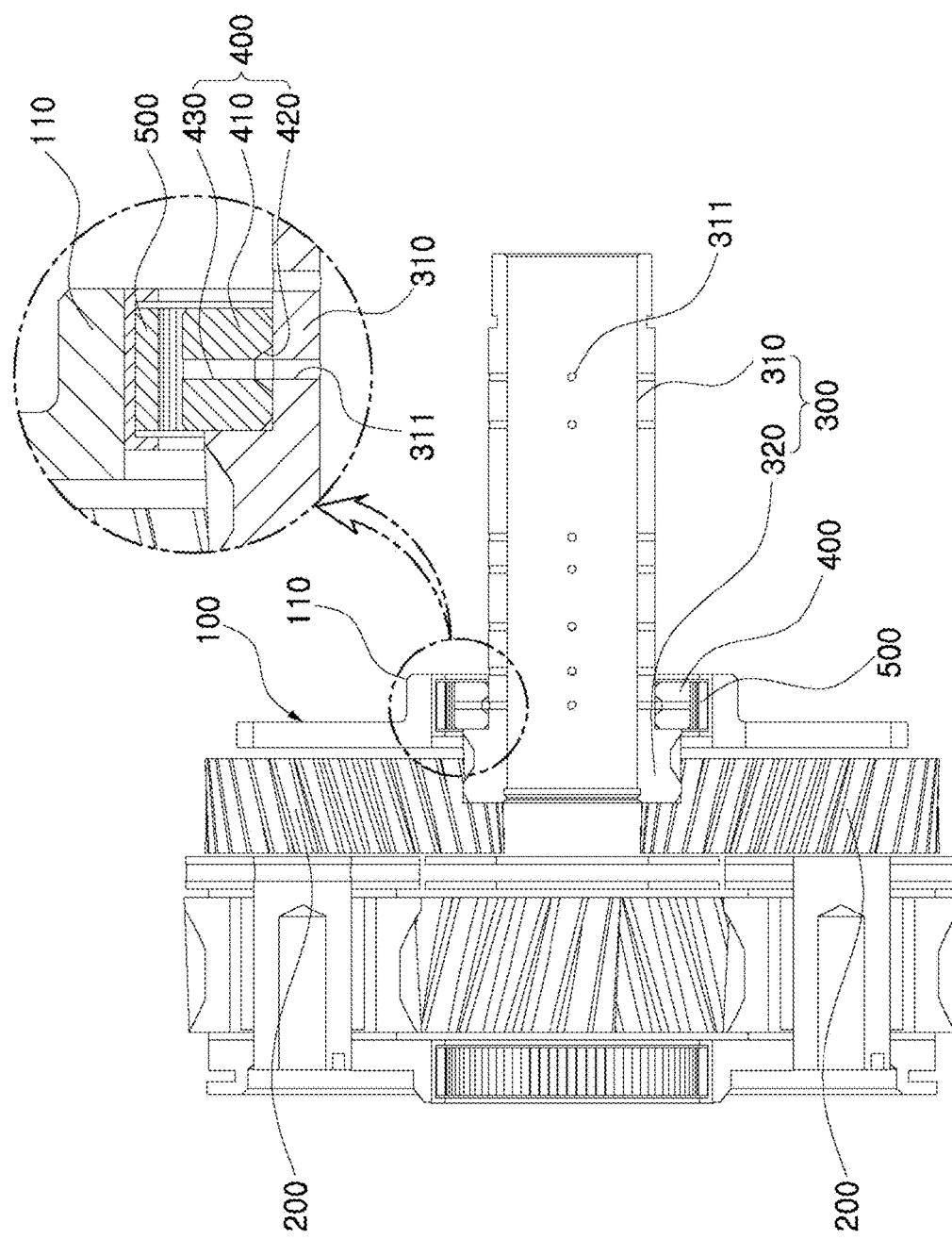
FIG. 2 is a cross-sectional view schematically illustrating the planetary gear device according to an embodiment of the present disclosure.
Figure 3:
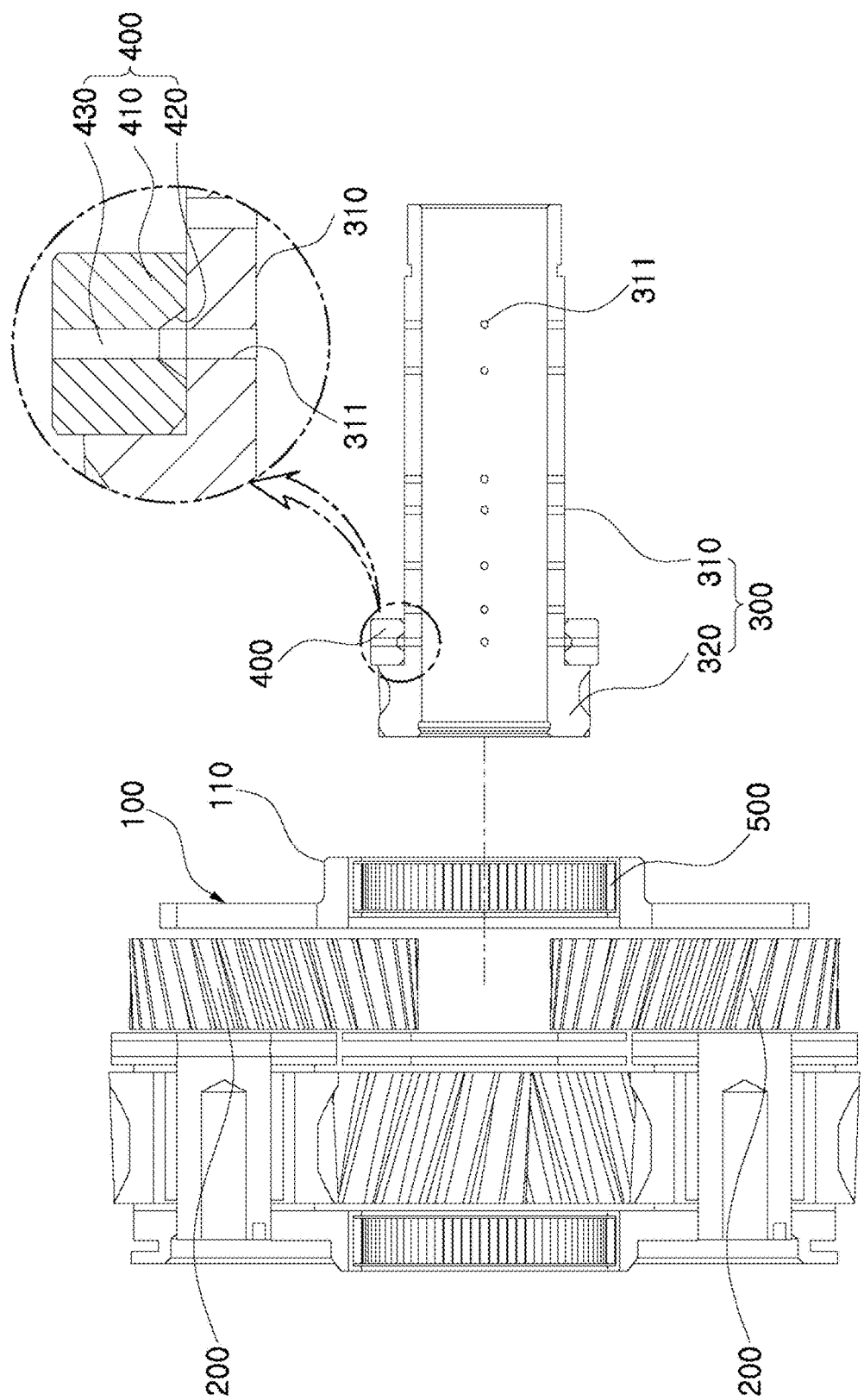
FIG. 3 is an assembled cross-sectional view schematically illustrating the planetary gear device according to an embodiment of the present disclosure.
Figure 4:
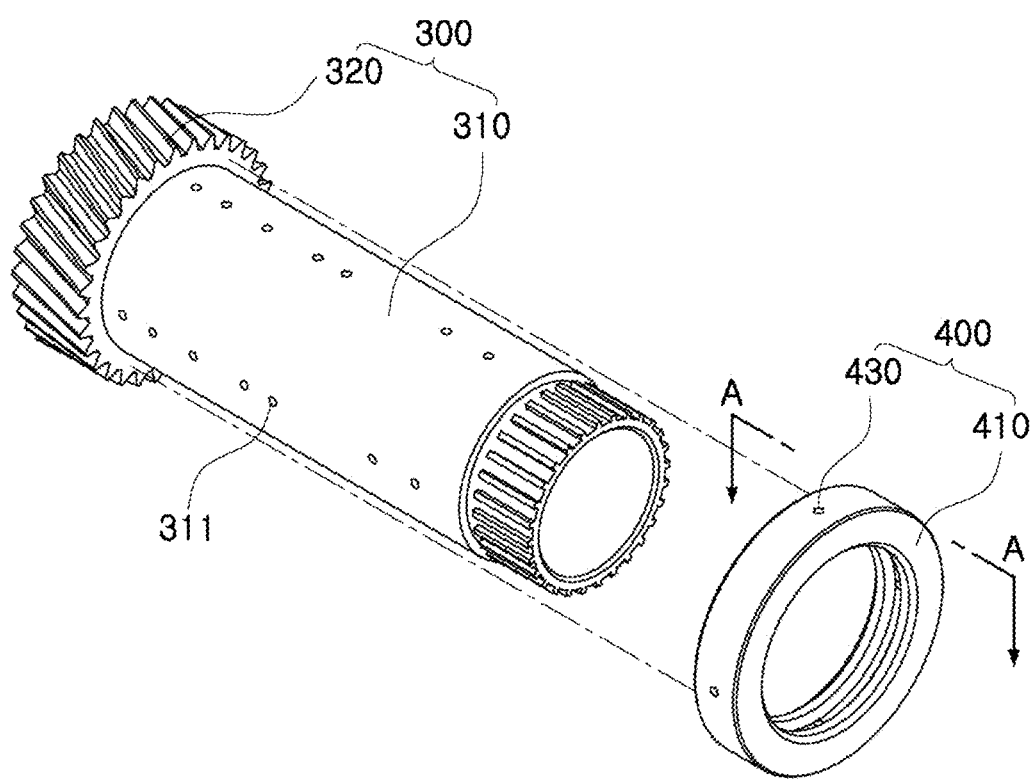
FIG. 4 is an assembled perspective view schematically illustrating a sun gear and a support ring of the planetary gear device according to an embodiment of the present disclosure.
Figure 5:
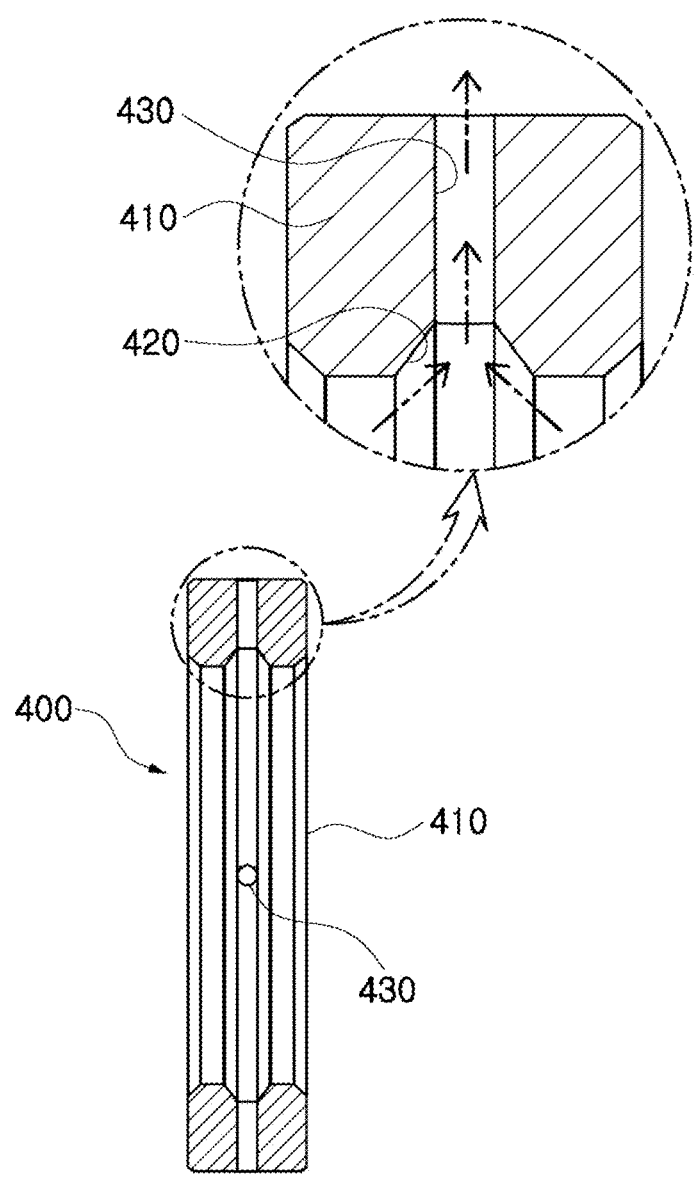
FIG. 5 is a cross-sectional view schematically illustrating the part A-A in FIG. 4.

FIG. 1 is a perspective view schematically illustrating a planetary gear device according to an embodiment of the present disclosure, FIG. 2 is a cross-sectional view schematically illustrating the planetary gear device according to an embodiment of the present disclosure, FIG. 3 is an assembled cross-sectional view schematically illustrating the planetary gear device according to an embodiment of the present disclosure, FIG. 4 is an assembled perspective view schematically illustrating a sun gear and a support ring of the planetary gear device according to an embodiment of the present disclosure, and FIG. 5 is a cross-sectional view schematically illustrating the part A-A in FIG. 4.

Referring to FIGS. 1 and 5, the planetary gear device according to an embodiment of the present disclosure includes a carrier plate 100, pinion gears 200, a sun gear 300, a support ring 400, and a rotation support 500.

The central portion of the carrier plate 100 is perforated. The sun gear 300 is inserted into the perforated central portion of the carrier plate 100. A hub 110 having a receiving recess protrudes from the perforated central portion of the carrier plate 100 such that the sun gear 300 is inserted into the perforated central portion of the carrier plate 100. The hub 110 may accommodate the rotation support 500 therein.

The hub 110 protrudes to have the width equal to or greater than the width of the rotation support 500, so that the hub 110 may receive the rotation support 500 therein. The hub 110 has an inner diameter greater than the outer diameter of the rotation support 500 such that the sun gear 300 is rotatable and the rotation support 500 may be received in the hub 110.

The pinion gears 200 are a plurality of gears rotatably mounted on the carrier plate 100. The pinion gears 200 are engaged with the sun gear 300.

The sun gear 300 is inserted into the hub 110 of the carrier plate 100 and is engaged with the pinion gears 200. The sun gear 300 includes a sun gear body 310 and a sun gear engagement portion 320.

The sun gear body 310 has the shape of a cylinder that is inserted into the hub 110 of the carrier plate 100. The support ring 400 is mounted on the outer surface of the sun gear body 310.

The sun gear body 310 has a plurality of oil discharge holes 311 penetrating therethrough. Oil discharged or flowing through the oil discharge holes 311 is collected by oil collectors 420 of the support ring 400 and is then transferred to the rotation support 500.

Thus, the rotation support 500 may support the rotation of the sun gear 300 and the support ring 400 while reducing the friction and noise of the sun gear 300 and the support ring 400 during the rotation of the sun gear 300 and the support ring 400, using the oil transferred thereto.

The sun gear engagement portion 320 is comprised of teeth provided on one end portion of the sun gear body 310 (i.e. the left end portion in FIG. 4), and is engaged with the pinion gears 200. The teeth of the sun gear engagement portion 320 and the teeth of the pinion gears 200 are shaped to engage with each other.

The support ring 400 is mounted around the outer surface of the sun gear 300. Oil is transferred from the sun gear 300 to the rotation support 500 through the support ring 400, thereby facilitating the rotation of the sun gear 300.

The support ring 400 includes a support ring body 410, the oil collectors 420, and oil outlets 430. The support ring body 410 is mounted on the outer surface of the sun gear body 310, and has the shape of a hollow ring. The outer surface of the support ring body 410 faces toward the inner surface of the rotation support 500. The support ring body 410 has an outer diameter smaller than the inner diameter of the rotation support 500 such that the support ring body 410 is rotatable within the rotation support 500.

The oil collectors 420 are provided inside the support ring body 410, and collect oil discharged from the sun gear body 310. The oil collectors 420 are a plurality of oil collectors disposed on inner portions of the support ring body 410, in the circumferential direction of the support ring body 410. The oil collectors 420 are disposed at equal distances in the circumferential direction of the support ring body 410 so as to inhibit oil from being concentrated to one of the oil collectors 420. Accordingly, oil may be uniformly collected by the plurality of oil collectors 420.

Referring to FIG. 5, each of the oil collectors 420 is configured such that the width thereof decreases toward the corresponding oil outlet 430 inside the support ring body 410. That is, the oil collectors 420 have the shape of funnels, such that the widths thereof decrease toward the oil outlets 430, inside the support ring body 410. The funnel-shaped oil collectors 420 may easily collect oil discharged from the oil discharge holes 311 of the rotating sun gear body 310 and allow the oil flow to the oil outlets 430.

The oil outlets 430 communicate with the oil collectors 420, and serve to discharge oil to the outer surface of the support ring body 410 and guide the oil to the rotation support 500. The oil outlets 430 are a plurality of oil outlets disposed in the circumferential direction of the support ring body 410. The oil outlets 430 are disposed at equal distances in the circumferential direction of the support ring body 410. The plurality of oil outlets 430 are disposed at equal distances in the circumferential direction of the support ring body 410, thereby allowing the oil to be discharged and flow uniformly to the rotation support 500. Thus, the oil may be uniformly supplied to the rotation support 500.

The rotation support 500 is mounted on the carrier plate 100, and supports the support ring 400 such that the support ring 400 is rotatable. The rotation support 500 supports the sun gear 300 and the support ring 400 using the oil supplied through the support ring 400 so that the sun gear 300 and the support ring 400 may smoothly rotate.

According to the present disclosure, the rotation support 500 may be implemented as a bearing, thereby allowing the sun gear 300 and the support ring 400 to smoothly rotate.

Alternatively, according to the present disclosure, the rotation support 500 is implemented as a hollow bush. The support ring 400 is disposed inside the rotation support 500 implemented as a hollow bush. The bush of the rotation support 500 is made of a metal material (or metallic material). Since the rotation support 500 is implemented as a hollow bush, the fabrication unit cost and the assembly cost may be reduced compared to a case in which the rotation support 500 is implemented as a bearing.

The operation of the planetary gear device according to an embodiment of the present disclosure, having the above described configuration, will be described hereinafter.

As the sun gear 300 rotates, oil flowing in the sun gear body 310 flows to the support ring 400 through the oil discharge holes 311. Since the support ring 400 is mounted on the outer surface of the sun gear body 310, the oil collectors 420 in contact with the sun gear body 310 collect the oil.

The oil collected by the oil collectors 420 is transferred to the rotation support 500 through the oil outlets 430 communicating with the oil collectors 420. Since the plurality of oil outlets 430 are disposed in the support ring body 410 at equal distances in the circumferential direction of the support ring body 410, the oil is uniformly supplied to the rotation support 500.

The rotation support 500, to which the oil is uniformly supplied, may allow the sun gear 300 and the support ring 400 to smoothly rotate, thereby reducing friction and noise.

The planetary gear device according to the present disclosure may support the carrier plate 100 and include the support ring 400 mounted on the outer surface of the sun gear 300, thereby reducing noise and improving durability.

In addition, according to the present disclosure, the support ring 400 guides the supply of oil from the sun gear 300 toward the rotation support 500, so that the operation may be smoothly performed.

Although exemplary embodiments of the disclosure have been disclosed for illustrative purposes, those skilled in the art will appreciate that various modifications, additions and substitutions are possible, without departing from the scope and spirit of the disclosure as defined in the accompanying claims. Thus, the true technical scope of the disclosure should be defined by the following claims.

What is claimed is:

1. A planetary gear device comprising:
a carrier plate having a perforated central portion;
a plurality of pinion gears rotatably mounted on the carrier plate;
a sun gear inserted into the carrier plate and engaged with the pinion gears;
a support ring mounted around an outer surface of the sun gear; and
a rotation support mounted on the carrier plate and supporting the support ring such that the support ring is rotatable,
wherein the support ring comprises:
a support ring body mounted on the sun gear;
a plurality of oil collectors provided inside the support ring body and configured to collect oil discharged from the sun gear; and
a plurality of oil outlets each configured to discharge oil from a corresponding one of the plurality of oil collectors to an outer surface of the support ring body.

2. The planetary gear device according to claim 1, wherein the sun gear comprises:
a sun gear body inserted into the carrier plate; and
a sun gear engagement portion provided on one end portion of the sun gear body and engaged with the pinion gears,
wherein the support ring is mounted on an outer surface of the sun gear body.

3. The planetary gear device according to claim 1, wherein the carrier plate has a protruding hub having a receiving recess accommodating the rotation support.

4. The planetary gear device according to claim 1, wherein the rotation support comprises a bearing.

5. The planetary gear device according to claim 1, wherein the rotation support comprises a hollow bush.

6. The planetary gear device according to claim 1, wherein the plurality of oil collectors comprises oil collectors disposed spaced apart from each other in a circumferential direction of the support ring body.

7. The planetary gear device according to claim 6, wherein the plurality of oil outlets comprises a plurality of oil outlets disposed spaced apart from each other in the circumferential direction of the support ring body.

8. The planetary gear device according to claim 6, wherein the plurality of oil outlets comprises a plurality of oil outlets disposed spaced apart from each other at equal distances in the circumferential direction of the support ring body.

9. The planetary gear device according to claim 1, wherein each oil collector of the plurality of oil collectors is configured such that a width thereof decreases toward a corresponding oil outlet of the plurality of oil outlets inside the support ring body.

10. The planetary gear device according to claim 1, wherein the plurality of oil outlets comprises a plurality of oil outlets disposed spaced apart from each other in a circumferential direction of the support ring body.

11. The planetary gear device according to claim 1, wherein the plurality of oil outlets comprises a plurality of oil outlets disposed spaced apart from each other at equal distances in a circumferential direction of the support ring body.

12. A planetary gear device comprising:
a carrier plate having a perforated central portion;
a plurality of pinion gears rotatably mounted on the carrier plate;
a sun gear inserted into the carrier plate and engaged with the pinion gears;
a support ring mounted around an outer surface of the sun gear; and
a rotation support mounted on the carrier plate and supporting the support ring such that the support ring is rotatable,
wherein the sun gear comprises:
a sun gear body inserted into the carrier plate; and
a sun gear engagement portion provided on one end portion of the sun gear body and engaged with the pinion gears,
wherein the support ring is mounted on an outer surface of the sun gear body, and
wherein the support ring comprises:
a support ring body mounted on the sun gear body;
an oil collector provided inside the support ring body and configured to collect oil discharged from the sun gear body; and
an oil outlet communicating with the oil collector and configured to discharge oil to an outer surface of the support ring body and guide the oil to the rotation support.

13. The planetary gear device according to claim 12, wherein the oil collector is configured such that the width thereof decreases towards the oil outlet inside the support ring body.

14. The planetary gear device according to claim 12, wherein the oil outlet is one of a plurality of oil outlets disposed in a circumferential direction of the support ring body.

15. The planetary gear device according to claim 14, wherein the oil outlets of the plurality of oil outlets are disposed at equal distances in the circumferential direction of the support ring body.

16. The planetary gear device according to claim 12, wherein the carrier plate has a protruding hub having a receiving recess accommodating the rotation support.

17. The planetary gear device according to claim 12, wherein the rotation support comprises a bearing.

18. The planetary gear device according to claim 12, wherein the rotation support comprises a hollow bush.

* * * * *